US006764223B2

(12) United States Patent
Rosson et al.

(10) Patent No.: US 6,764,223 B2
(45) Date of Patent: Jul. 20, 2004

(54) FERRULE HAVING ALIGNMENT FEATURES FOR POLISHING OPERATIONS AND AN ASSOCIATED POLISHING JIG AND METHOD

(75) Inventors: Joel Rosson, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/411,605

(22) Filed: Apr. 10, 2003

(65) Prior Publication Data

US 2003/0210871 A1 Nov. 13, 2003

Related U.S. Application Data

(62) Division of application No. 09/428,386, filed on Oct. 28, 1999, now Pat. No. 6,601,996.

(51) Int. Cl.$^7$ .............................................. G02B 6/36
(52) U.S. Cl. ..................................................... 385/78
(58) Field of Search ...................... 451/41, 65; 385/55, 385/54, 59, 63, 65, 71, 76, 72, 83, 136, 137

(56) References Cited

U.S. PATENT DOCUMENTS

| 5,813,902 A | 9/1998 | Wiegand ..................... 451/65 |
| 5,920,670 A | 7/1999 | Lee et al. ..................... 385/78 |
| 6,106,368 A * | 8/2000 | Childers et al. .............. 451/41 |

FOREIGN PATENT DOCUMENTS

JP  7-24747  1/1995  ............ G02B/6/40

* cited by examiner

Primary Examiner—Euncha P. Cherry
(74) Attorney, Agent, or Firm—Christopher C. Dremann

(57) ABSTRACT

A ferrule is provided that includes a ferrule body defining a longitudinally extending groove that can serve as an alignment feature for polishing operations. In this regard, the ferrule body extends longitudinally between opposed front and rear surfaces so that at least the rear surface generally defines a substantially rectangular shape in lateral cross-section. In addition, the ferrule body typically has first and second major sides and first and second minor sides with the first and second major sides being larger than the first and second minor sides. The ferrule body defines the longitudinally extending groove in at least one of the major surfaces. A jig is also provided for engaging the longitudinally extending groove defined by the ferrule body in order to hold the ferrule in an aligned position during polishing operations. In this regard, the jig includes a jig body having an alignment feature for engaging a complimentary alignment feature of the ferrule. The jig also includes a support element capable of engaging another side of the ferrule, wherein at least one of the jig body and the support element is capable of pivoting. By appropriately sizing those elements of the jig body and the support element that contact the ferrule, the contact elements can be inserted through openings defined by the connector housing such that the front surface of the ferrule can be precisely polished after the ferrule has been assembled into a fiber optic connector.

18 Claims, 8 Drawing Sheets

FERRULE HAVING ALIGNMENT FEATURES FOR POLISHING OPERATIONS AND AN ASSOCIATED POLISHING JIG AND METHOD

CROSS REFERENCE TO RELATED APPLICATIONS

This application is a divisional application of Ser. No. 09/428,386, filed Oct. 28, 1999, U.S. Pat. No. 6,601,996.

FIELD OF THE INVENTION

The present invention relates generally to ferrules having a polished front surface and, more particularly, to ferrules having alignment features to facilitate the polishing of their front surfaces following the preassembly of the ferrules into connectors, as well as an associated jig and method for holding a ferrule during polishing operations.

BACKGROUND OF THE INVENTION

Optical fibers are utilized for a variety of applications, including data transmission and the like. In order to interconnect the optical fibers, fiber optic connectors are mounted upon the end portions of the optical fibers, and pairs of the fiber optic connectors are thereafter mated. In order to provide an optical connection with the relatively low attenuation and the small return loss demanded by many modern applications, fiber optic connectors are generally designed such that fiber-to-fiber contact is established between the optical fibers upon which the respective fiber optic connectors are mounted. For example, fiber-to-fiber contact is preferably established between each optical fiber of a first fiber optic cable upon which a first-fiber optic connector is mounted and the respective optical fibers of a second fiber optic cable upon which a second fiber optic connector is mounted, once the first and second fiber optic connectors have been mated.

In order to establish fiber-to-fiber contact, the front surface of the ferrule of each fiber optic connector must be precisely formed to ensure that the front surface is extremely smooth and planar and to minimize any angular errors relative to the optical fiber bores defined by the ferrule. In other words, the front surface of the ferrule is preferably formed to define a planar surface that extends perpendicular to the longitudinal axes of the optical fiber bores. By way of example, the front face of most ferrules must generally have an angular error of less than 0.2° relative to the optical fiber bores to ensure that the optical fibers upon which the ferrule is mounted can be brought into dry physical contact with the optical fibers of another fiber optic connector.

Most ferrules are molded from a plastic material. Although the ferrules are typically molded to within relatively specific tolerances, the front surfaces of the ferrule are generally unable to be molded to have a sufficiently smooth front surface and to have a sufficiently small angular error. As such, the front surfaces of the ferrule must generally be polished after the ferrule has been mounted upon the end portions of the optical fibers. Not only does the polishing serve to smooth the front surface and to reduce the angular error of the front surface of the ferrule to within acceptable limits, such as less than 0.2°, but the polishing also serves to ensure that the ends of the optical fibers are properly positioned relative to the front surface of the ferrule, such as by either being flush with the front surface of the ferrule or by protruding by a predetermined amount relative to the front surface of the ferrule.

The front face of the ferrule is generally polished to have a predetermined angular relationship, such as 90°, with respect to the longitudinal axes of the optical fiber bores defined by the ferrule. Since the longitudinal axes of the optical fiber bores are inaccessible for use as a reference point or datum during polishing operations, ferrules are typically designed to have some other reference point or datum that has a predefined positional or angular relationship with respect to the longitudinal axes of the optical fiber bore. As such, the polishing of the front face of the ferrule can be done with respect to the datum that is accessible in order to appropriately polish the front face of the ferrule relative to the longitudinal axes of the optical fiber bores.

With respect to cylindrical single fiber ferrules, the outer diameter of the cylindrical shaft portion of the single fiber ferrule is typically used as the datum. The cylindrical shaft portion of a single fiber ferrule is an effective datum for polishing purposes for at least two reasons. First, the outer diameter of the cylindrical shaft of a single fiber ferrule has a predefined relationship with the longitudinal axis of the optical fiber bore, namely, the longitudinal axes of the optical fiber bore and the cylindrical shaft of the single fiber ferrule are usually coincident. Secondly, the outer diameter of the cylindrical shaft portion of a single fiber ferrule is required to be precisely formed since the outer diameter of the cylindrical shaft of a single fiber ferrule is also utilized to align the optical fiber upon which the ferrule is mounted with another optical fiber during the process of mating a pair of single fiber connectors. In this regard, the outer diameter of the cylindrical shaft portion of a single fiber ferrule is typically formed to within a tolerance of one micron.

In order to polish the front face of the single fiber ferrule, the cylindrical shaft portion of the ferrule is positioned within a precision bore defined by a polishing fixture. As will be apparent, the precision bore has a precise size, such as to within a tolerance of one micron or so, and a predetermined orientation. While the single fiber ferrule is held by the precision bore of the polishing fixture, the front surface of the single fiber ferrule is brought into contact with the polishing media and polished.

While the outer diameter of a ferrule is an effective datum for cylindrical single fiber ferrules, the exterior dimensions of a multifiber ferrule are not generally defined to within such exacting tolerances since the exterior surfaces of a multifiber ferrule are not referenced in the same fashion as the outer diameter of the cylindrical shaft portion of a single fiber ferrule during the interconnection of a pair of multifiber connectors. In this regard, the outer surfaces of most multifiber ferrules are generally only formed to within tolerances of five microns or more. As such, the exterior dimensions of a multifiber ferrule generally cannot serve as a polishing datum.

Since the exterior surface of a multifiber ferrule does not generally serve as a polishing datum, multifiber ferrules must include other features to serve as a polishing datum. In this regard, the shoulder, or at least portions of the shoulder, defined between the shaft of a multifiber ferrule and the enlarged rear portion of a multifiber ferrule typically serves as a polishing datum. In this regard, the shoulder of a multifiber ferrule is typically formed to be within fairly specific tolerances and to have a predefined relationship with respect to the longitudinal axes defined by the optical fiber bores, namely, a perpendicular relationship with respect to the longitudinal axes defined by the optical fiber bores. However, the shoulder of a multifiber ferrule is typically inaccessible once the multifiber ferrule has been assembled within a connector housing of a multifiber connector. As such, the front face of a multifiber ferrule must typically be polished after the multifiber ferrule has been mounted upon the end portions of a plurality of optical fibers, but prior to assembling the multifiber connector. Since the multifiber ferrule must be mounted upon the end portions of a plurality of optical fibers prior to assembling the multifiber connector, multifiber connectors are not typically assembled in the factory, at which time the assembly process could be efficiently performed in an automated fashion. Instead, a multifiber connector is typically assembled in the field once a technician has mounted a multifiber ferrule upon the end portions of a plurality of optical fibers and the front surface of the ferrule has been polished. As such, polishing the front surface of a multifiber ferrule prior to assembling the multifiber connector decreases the efficiency with which the connector can be assembled and is generally a much less cost effective technique for producing multifiber connectors.

While the exterior surfaces of a multifiber ferrule could be formed more precisely to serve as a polishing datum in much the same fashion as the outer diameter of a cylindrical single fiber ferrule, the manufacture of a multifiber ferrule having precisely formed exterior surfaces would disadvantageously increase the cost of the multifiber ferrule. As such, multifiber ferrules are not generally formed with precisely defined exterior surfaces for use as polishing datums even though the use of such precisely defined exterior surfaces as polishing datums would permit a multifiber connector to be preassembled prior to polishing the front surface of the multifiber ferrule.

As described above, a variety of techniques are available for polishing the front surface of the ferrule. With respect to multifiber ferrules, however, conventional polishing techniques dictate that the front surface be polished after the multifiber ferrule has been mounted upon the plurality of optical fibers, but prior to assembling the multifiber ferrule. In view of the increased costs and inefficiencies incurred to polish the multi fiber ferrule in a disassembled state and to then subsequently assemble a multifiber connector including the polished ferrule in the field, it would be desirable to develop other polishing techniques to permit the front surface of a multifiber ferrule to be precisely polished following assembly of a multifiber connector.

SUMMARY OF THE INVENTION

A ferrule is therefore provided according to one embodiment of the present invention that includes a ferrule body defining a longitudinally extending groove that can serve as an alignment feature for polishing operations. In this regard, the ferrule body extends longitudinally between opposed front and rear surfaces so that at least the rear surface generally defines a substantially rectangular shape in lateral cross-section. In addition, the ferrule body typically has first and second major sides and first and second minor sides with the first and second major sides being larger than the first and second minor sides. According to the present invention, the ferrule body defines the longitudinally extending groove in at least one of the major surfaces. A jig is also provided according to another embodiment of the present invention for engaging the alignment feature of the ferrule body in order to hold the ferrule in an aligned position during polishing operations. In this regard, the jig includes a jig body that also has an alignment feature for engaging the complimentary alignment feature of the ferrule and a support element having a support surface capable of engaging another side of the ferrule, wherein at least one of the jig body and the support element is capable of pivoting. As such, the front surface of the ferrule can be precisely polished after the ferrule has been assembled into a fiber optic connector since the longitudinally extending groove defined by the ferrule body that serves as the polishing datum is accessible following assembly of the fiber optic connector.

With respect to the ferrule of the present invention, the longitudinally extending groove defined by the ferrule of one advantageous embodiment has a V-shape in lateral cross-section. In this embodiment, the V-shaped groove is truncated such that the groove is defined by a pair of sloping sidewalls and a bottom surface extending between the pair of sloping sidewalls. Regardless of its shape, the groove is preferably defined to extend longitudinally through a medial portion of the respective major surface. In this regard, the ferrule body also typically defines a plurality of optical fiber bores and a pair of guide pin openings on opposite sides of the optical fiber bores. As such, the groove is preferably disposed between the pair of guide pin openings such that the strength and mechanical integrity of the ferrule is not significantly diminished, if at all. In addition, while the ferrule body need only define a single longitudinally extending groove in one of the first and second major surfaces, the ferrule body of one advantageous embodiment defines a pair of longitudinally extending grooves with one groove defined by each of the first and second major surfaces. As such, the ferrule body of this advantageous embodiment is symmetric relative to a plane extending through the optical fiber bores and has a bowtie shape in lateral cross-section.

According to another aspect of the present invention, a polishing jig is also provided that includes an alignment feature for cooperating with the alignment feature of the ferrule to hold the ferrule in an aligned position during polishing operations. In this regard, the alignment features of the ferrule and the polishing jig are selected from a group consisting of a V-shaped alignment groove and an outwardly protruding alignment member having a semicircular shape in cross-section. The alignment features of the ferrule and the polishing jig are therefore selected from the group such that the ferrule includes one type of alignment feature, such as the longitudinally extending groove as described above, and the polishing jig includes the other type of alignment feature.

The polishing jig preferably includes a jig body having a contact element that typically includes the alignment feature, and a support element having a support surface such that the ferrule is held in an aligned position between the jig body and the support element. Typically, one of the support element and the jig body is capable of pivoting about an axis perpendicular to the alignment feature of the jig body to ensure that the ferrule is evenly supported or loaded across its entire surface during the subsequent polishing operations. The support surface of the support element also preferably includes a contact element, such as at least one rib, that protrudes outwardly relative to the other portions of the support surface. By contacting the ferrule with the contact element and not with the other portions of the support surface, the support element of this embodiment of the present invention reduces the contact area and correspondingly reduces the deleterious impact of dirt that may have accumulated on the surface of the ferrule on the resulting alignment of the ferrule within the polishing jig. In one advantageous embodiment, the contact element of the support element includes a pair of parallel ribs. Alternatively, the contact element of the support element can include a T-shaped rib.

The contact elements, such as the alignment feature of the jig body and the ribs of the support element, are preferably sized such that the support elements can be inserted through corresponding openings defined by the connector housing. As such, the polishing jig of the present invention can engage a ferrule following preassembly of the connector. As such, the front face of the ferrule can advantageously be polished following assembly of the connector.

As described above, the alignment feature of the ferrule is typically a longitudinally extending groove. Correspondingly, the alignment feature of the jig is typically an outwardly protruding alignment member, such an alignment rib carried by the jig body and adapted to engage the groove defined by the ferrule. In this regard, the groove defined by the ferrule and the outwardly protruding alignment member carried by the jig body have cross-sectional shapes selected from the group consisting of a semicircular shape and a V-shape. Typically, the ferrule defines a V-shaped groove and the jig body includes an outwardly protruding alignment member having a semicircular shape, although the ferrule can include the outwardly extending alignment member and the jig body can define the V-shaped groove, if so desired.

According to the present invention, the polishing jig can securely hold the ferrule in an aligned position during polishing operations even after the ferrule has been assembled as part of the fiber optic connector. In this regard, by engaging the V-shaped groove defined by the ferrule of one embodiment of the invention with an outwardly protruding alignment rib having a semicircular cross-section, the jig body effectively establishes two lines of contact with the ferrule. In addition, by supporting the opposite side of the ferrule with the support element, a third region of contact is established, thereby insuring that the ferrule is held by the polishing jig in an aligned and secure fashion even after the ferrule has been incorporated into a multifiber ferrule. As such, the longitudinally extending groove defined by the ferrule can serve as the datum during polishing of the front surface thereof, even after the ferrule has been assembled into a connector.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
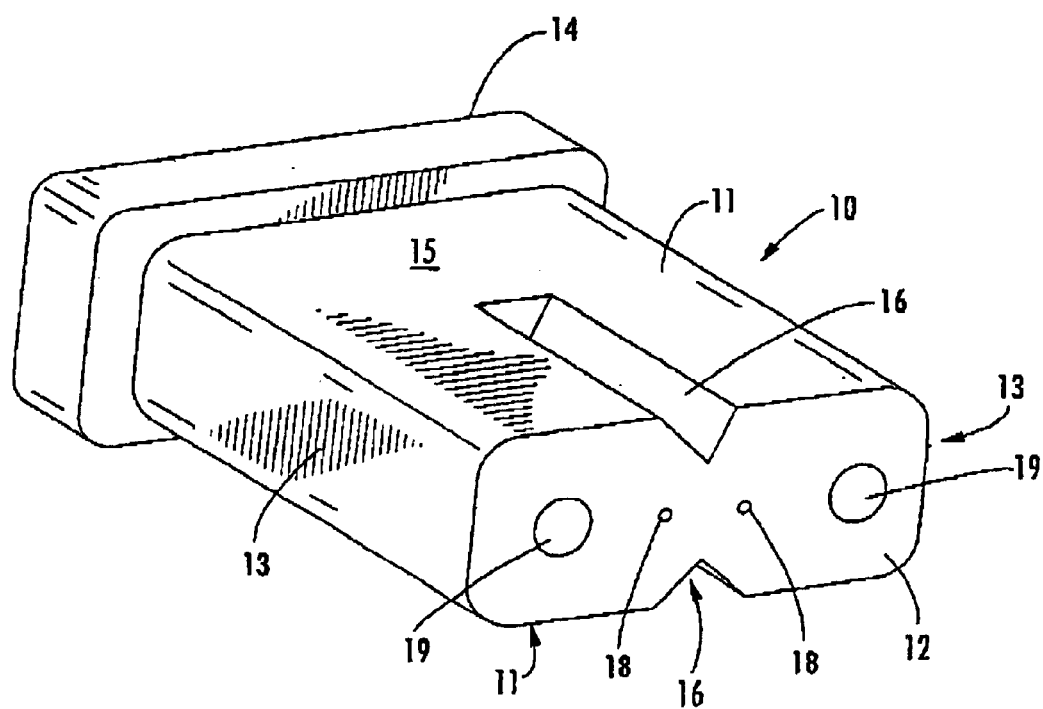
FIG. 1 is a perspective view of a ferrule according to one embodiment of the present invention.

Referring now to FIG. 1, a ferrule 10 according to one advantageous embodiment of the present invention is depicted. The ferrule includes a ferrule body extending longitudinally between opposed front and rear surfaces 12, 14. The ferrule of the present invention also includes an alignment feature that is accessible even after the assembly of a fiber optic connector that includes the ferrule such that the alignment feature can serve as a polishing datum during polishing operations. Although the alignment feature can be an outwardly protruding alignment member, such as a longitudinally extending alignment rib, the alignment feature is typically a longitudinally extending groove 16 defined by the ferrule body. The outside surface of the ferrule itself may also act as the datum where precise tolerances can be maintained-in a single fiber ferrule, for example.

As shown in FIG. 1, at least the rear surface 14 of the ferrule 10 typically defines a substantially rectangular shape in lateral cross-section. As such, the ferrule body generally includes first and second major sides 11 and first and second minor sides 13. As will be apparent, the first and second major sides are larger or wider than the first and second minor sides 13. As shown in FIG. 1, the longitudinally extending groove 16 is defined in at least one of the first and second major surfaces 15 of the ferrule body. Although the ferrule need only define a single longitudinally extending groove, the ferrule can define a pair of longitudinally extending grooves, one of which is defined in each of the first and second major surfaces 15 as shown in FIG. 1. In this embodiment, the ferrule, which has a bowtie shape in lateral cross-section, will be symmetric relative to a plane that extends through the optical fiber bores 18 defined by the ferrule. As a result of its symmetry, the ferrule may be more easily assembled into a fiber optic connector since its relative orientation is immaterial.

As shown in FIG. 1, the groove 16 defined by the ferrule 10 preferably extends longitudinally through a medial portion of the respective major surface 15. In this regard, the ferrule is typically a multifiber ferrule so as to also define the plurality of optical fiber bores 18 and a pair of guide pin openings 19 on opposite sides of the optical fiber bores. As such, the groove 16 defined by the ferrule is preferably disposed between the pair of guide pin openings 19. By defining the groove 16 in a medial portion of the ferrule body, the ferrule is not significantly weakened since a significant amount of material still exists between the groove 16 and the optical fiber bores 19. However, the ferrule can define the groove at other locations, if so desired.

Figure 2A:
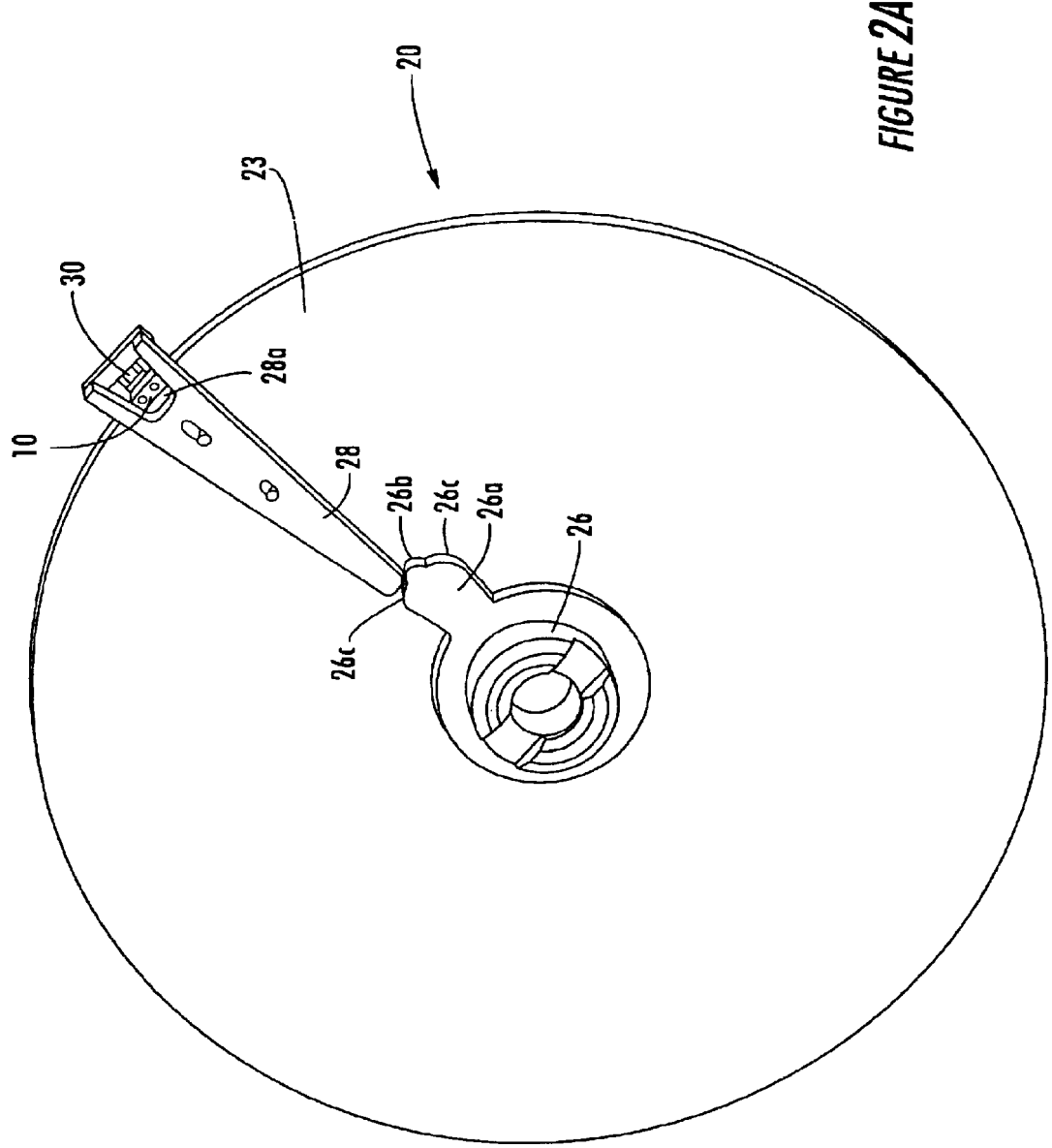
FIGS. 2A and 2B are increasingly enlarged perspective views of a jig according to one embodiment of the present invention in which a ferrule is held between a jig body and a pivotable support element.
Figure 2B:
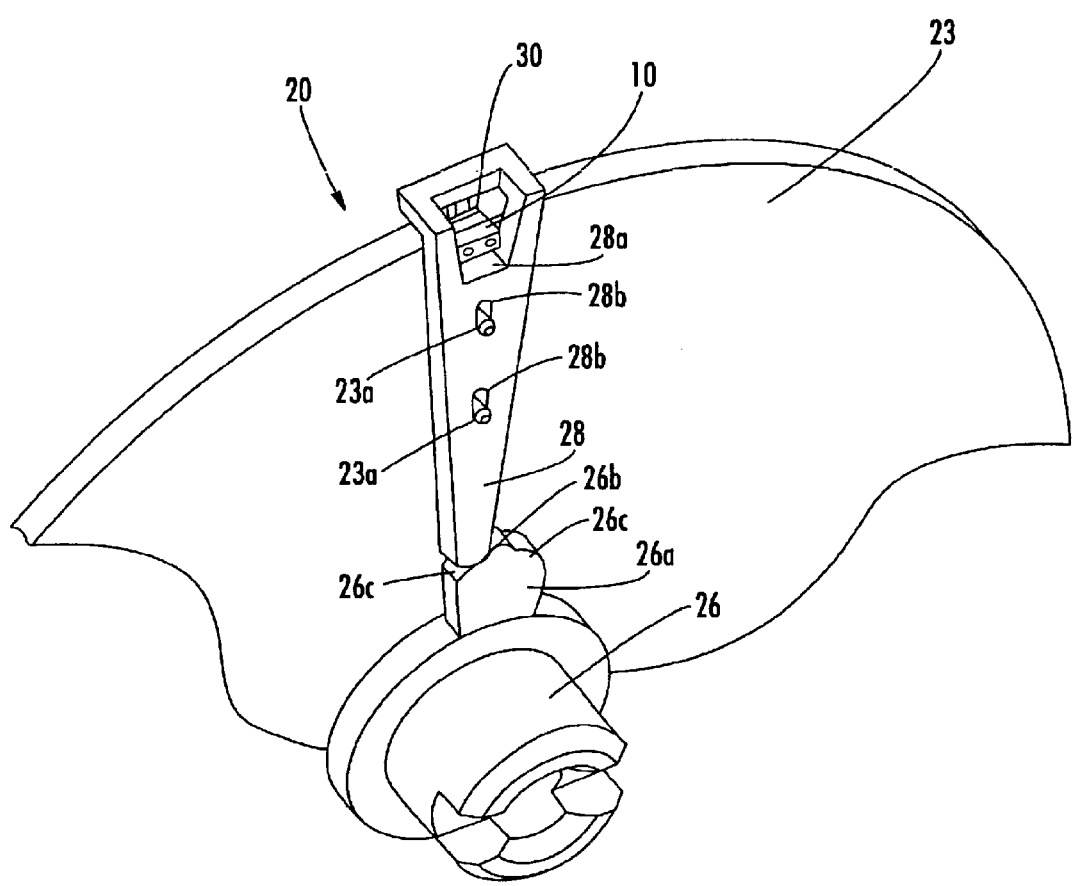
Figure 2C:
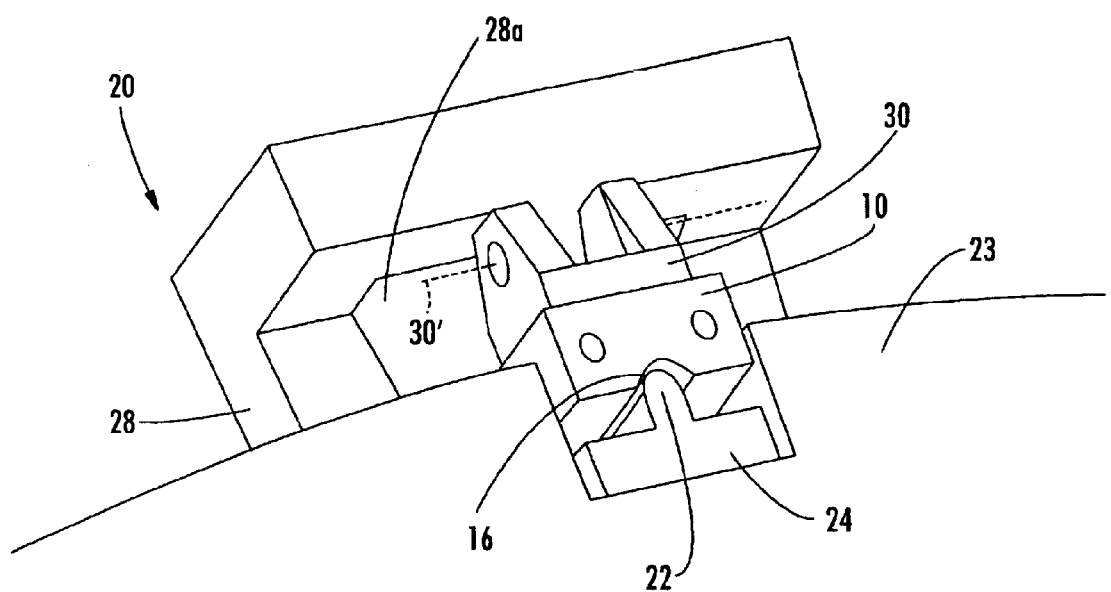
FIG. 2C is a further enlarged perspective view of a jig holding a ferrule, viewed from the opposite side of FIGS. 2A and 2B.
Figure 3:
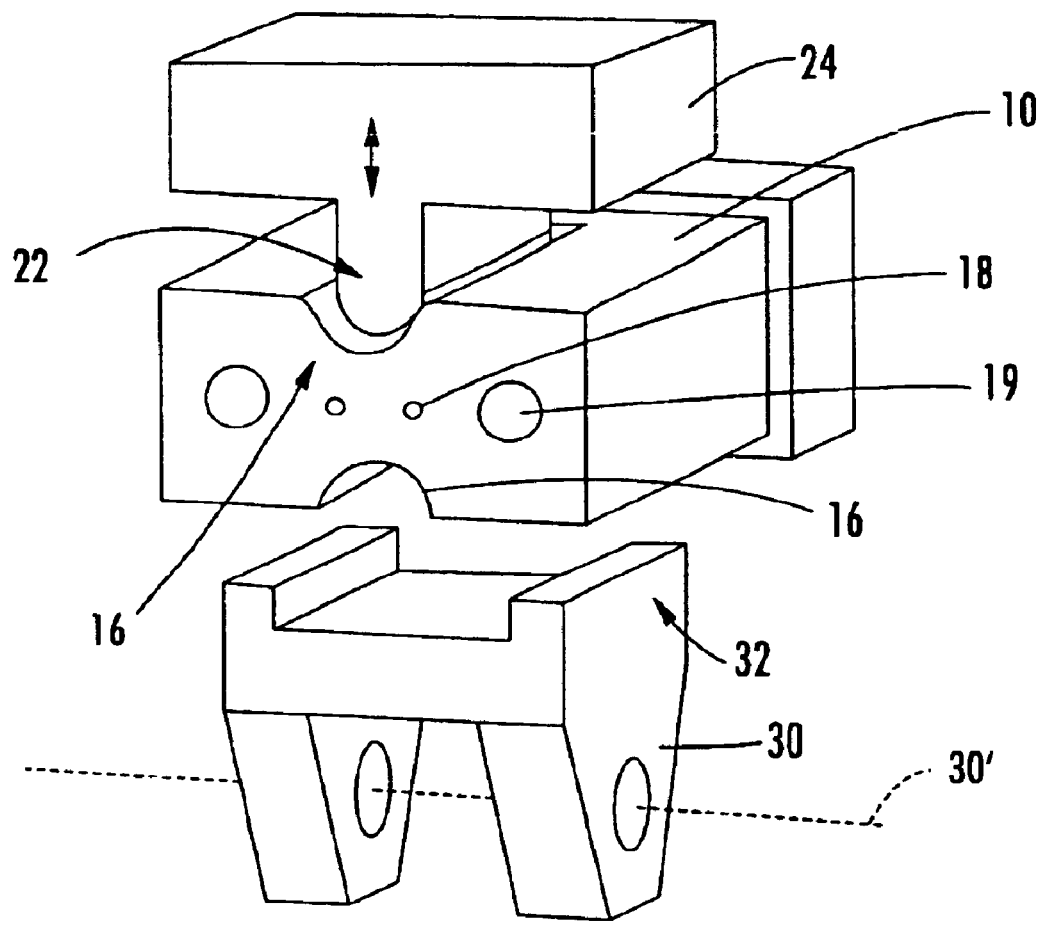
FIG. 3 is a perspective view illustrating the engagement of a ferrule by portions of a jig including a jig body and an opposed pivotable support element according to one embodiment to the present invention in which the other portions of the jig and the multifiber connector have been omitted for purposes of clarity.
Figure 5A:
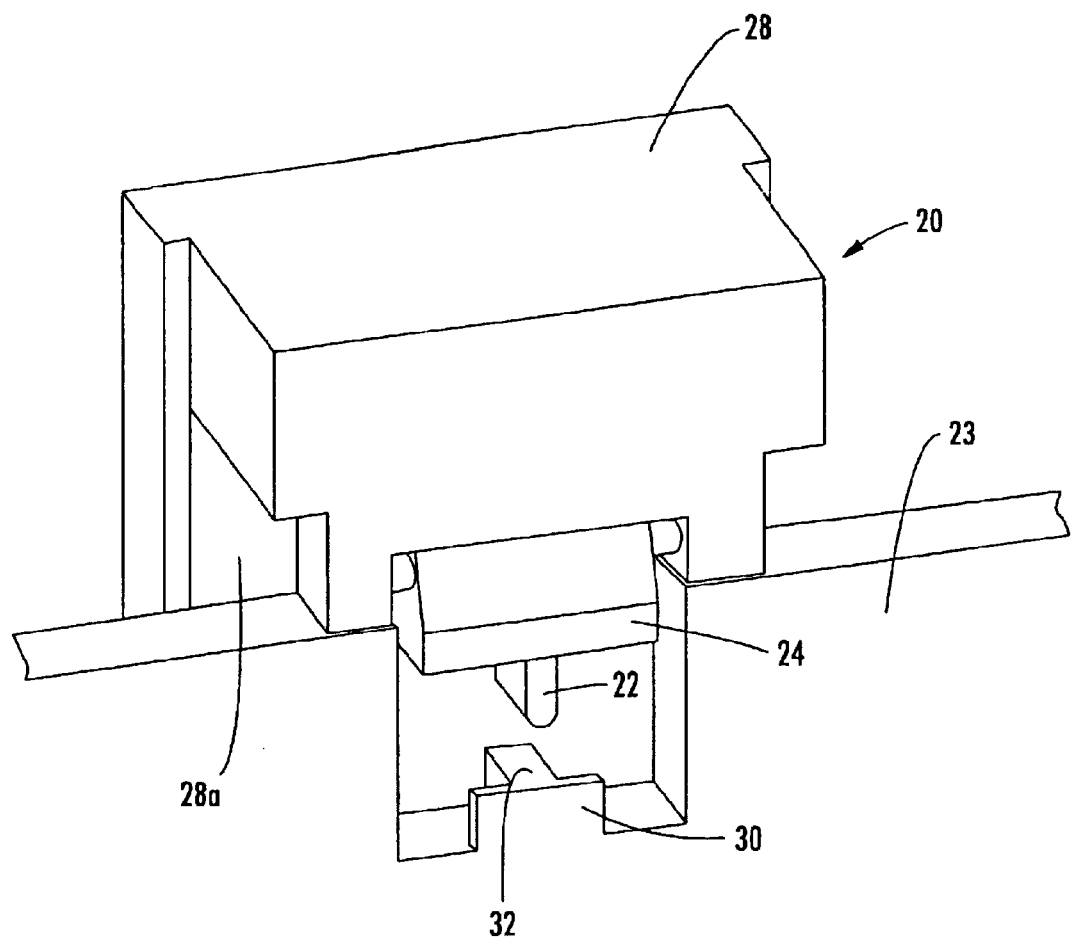
FIGS. 5A and 5B are fragmentary perspective views of a jig according to another embodiment of the present invention in which a ferrule of a preassembled connector is held between a pivotable jig body and a support element.
Figure 5B:
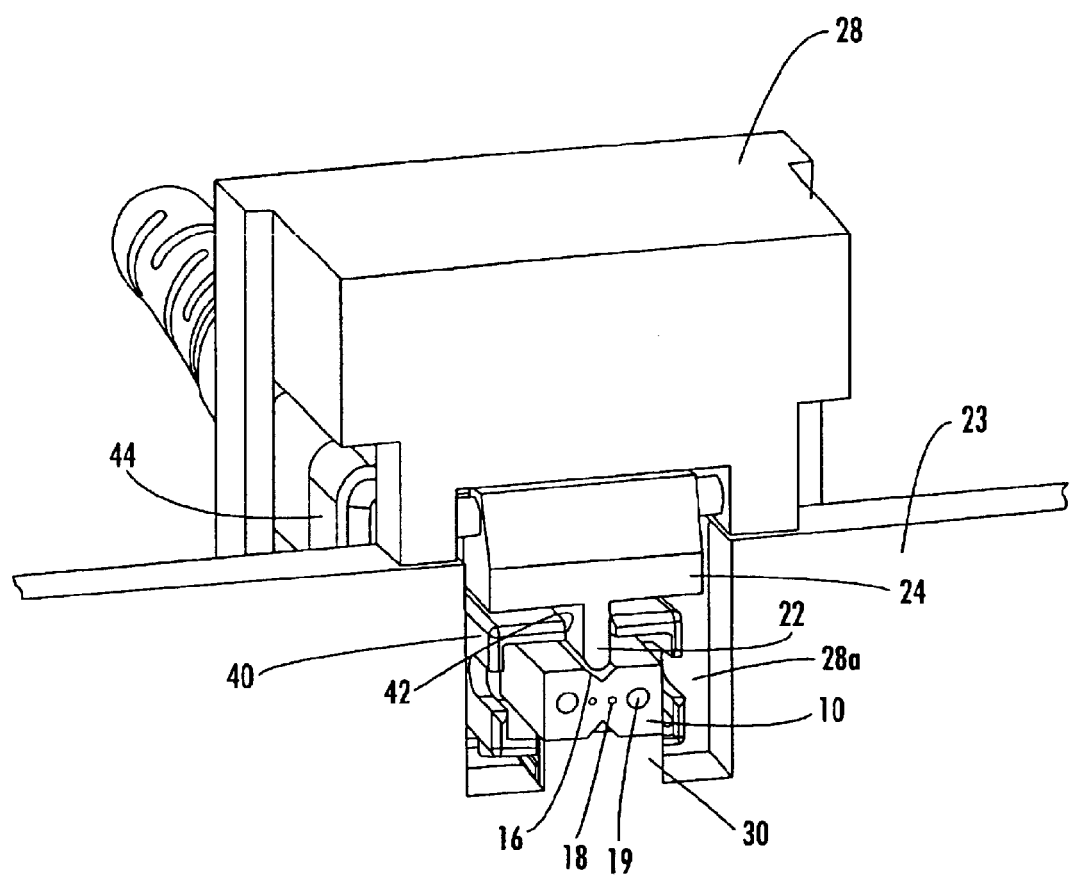

The groove 16 defined by the ferrule 10 can have a variety of shapes and lateral cross-sections, including a U or semicircular shape. However, the ferrule of one advantageous embodiment defines a groove that has a V-shape in lateral cross-section. As shown in FIGS. 1 and 5B, the V-shaped groove can be a true V-shape or, as shown in FIG. 2C, the V-shaped groove can be truncated since the corresponding alignment member of the polishing jig generally only contacts the opposed sides of the groove and does not contact the bottom of the groove, as described below. Also, as shown in FIG. 2C and 3, the V-shaped groove can be radiused. As such, the V-shaped groove is typically defined by a pair of sloping sidewalls and a radiused or flat bottom surface extending between the pair of sloping sidewalls. While the sidewalls can slope at a variety of angles without departing from the spirit and scope of the present invention, the sidewalls preferably slope at an angle of 30° to 60° and, more preferably, at 45° relative to a plane extending through the optical fiber bores 18 defined by the ferrule.

While the position of the groove 16 relating to the front surface 12 should be precisely defined, the groove can have a variety of sizes since the engagement of a V-shaped groove with an alignment member having a semicircular shape in lateral cross-section is relatively immune to changes in the size and depth of the groove. In one advantageous embodiment in which the shaft portion of the ferrule 10 is sized to be 4.4 mm by 2.45 mm, however, the grooves are centered within the respective major surfaces 15 and have a maximum width of 0.8 mm and a depth of 0.4 mm, and define sidewalls that slope at an angle of 45°. As shown in FIG. 1, the grooves 16 need not extend longitudinally along the entire length of the shaft of the ferrule. Instead, the grooves 16 need only be defined by the forwardmost portion of the ferrule since only the forwardmost portion of the ferrule will generally be exposed and can be accessed following assembly of the ferrule into a connector. In one embodiment in which the shaft portion of the ferrule has a length of 8 mm, the longitudinally extending grooves 16 have a length of 5 mm. However, the grooves 16 defined by the ferrule 10 can have other shapes, sizes, and lengths without departing from the spirit and scope of the present invention.

In order to polish the front surface 12 of the ferrule 10, the ferrule is typically held by a polishing jig 20. While the polishing jig will hereinafter be described in conjunction with the ferrule of FIG. 1, the polishing jig of the present invention can be adapted to hold both rectangular and cyclindrical ferrules during polishing operations conducted after preassembling the respective connectors.

With respect to the ferrule 10 of FIG. 1, however, the alignment feature of the ferrule, such as the lengthwise extending groove 16, preferably cooperates with a complimentary alignment feature or other contact element of the polishing jig 20 such that the ferrule can be held in an aligned position during polishing of the front surface 12 thereof. According to the present invention, the alignment features of the ferrule and the polishing jig are selected from the group consisting of an alignment groove and an outwardly protruding alignment member. In this regard, the alignment features of the ferrule and the polishing jig are selected from the group such that the ferrule includes one type of alignment feature and the polishing jig includes the other type of alignment feature. As described above, the ferrule of the present invention preferably includes a lengthwise extending groove, such as a V-shaped alignment groove. As such, the polishing jig generally includes an outwardly protruding alignment member 22 that typically has a semicircular shape in cross-section. However, the ferrule can include the outwardly extending alignment member and the polishing jig can define the alignment groove, if so desired. (An extreme example would be a cylindrical ferrule and a corresponding element having a concave shape.) For purposes of illustration, however, the polishing jig will be hereinafter described as having an outwardly protruding alignment member that serves as the respective alignment feature.

The polishing jig 20 can be designed in many different fashions without departing from the spirit and scope of the present invention. By way of example and not limitation, however, one embodiment of a polishing jig is shown in FIGS. 2A and 2B. In particular, the polishing jig of this embodiment includes a platform 23 that is typically fixed in position. As illustrated, the platform can be a circular plate. However, the platform can have any desired shape. The polishing jig also includes a jig body 24. As shown in FIGS. 2A and 2B, the jig body 24 is mounted to the platform, such as the edge portion of the circular plate. However, the jig body 24 can be mounted to other components of the jig as described below, if so desired. The jig body 24 has or carries a contact element that serves as the alignment feature 22, such as the outwardly protruding alignment member. The alignment member is capable of engaging the alignment feature, such as the groove 16, defined by the ferrule 10 once the ferrule is placed in the polishing jig. In this regard, the groove 16 defined by the ferrule 10 is preferably accessible even after the ferrule has been assembled into a connector. As known to those skilled in the art and as illustrated and described in conjunction with FIGS. 5A and 5B, for example, a connector housing 40 can define rib slots or other openings 42 that are aligned with the groove defined by the ferrule. Typically, the openings defined by the connector housing are proximate the forward end of the connector housing. However, the openings can be defined by other portions of the connector housing, if so desired, including holes or apertures in the connector housing. In order to permit the ferrule to be polished after the connector has been assembled, the outwardly protruding alignment member of the jig body 24 is preferably sized to be inserted through the rib slot or hole/aperture defined by the connector housing and into engagement with the ferrule, and in the illustrated embodiment, the groove defined by the ferrule. While the polishing jig and the ferrule of the present invention are designed to permit the front surface 12 of the ferrule 10 to be polished after the ferrule has been assembled into a connector, it will be noted that the polishing jig is depicted in FIGS. 2A–2C in conjunction with an individual ferrule for the sake of clarity. However, another embodiment of a polishing jig will subsequently be depicted in conjunction with a preassembled connector by way of further illustration.

Figure 4:
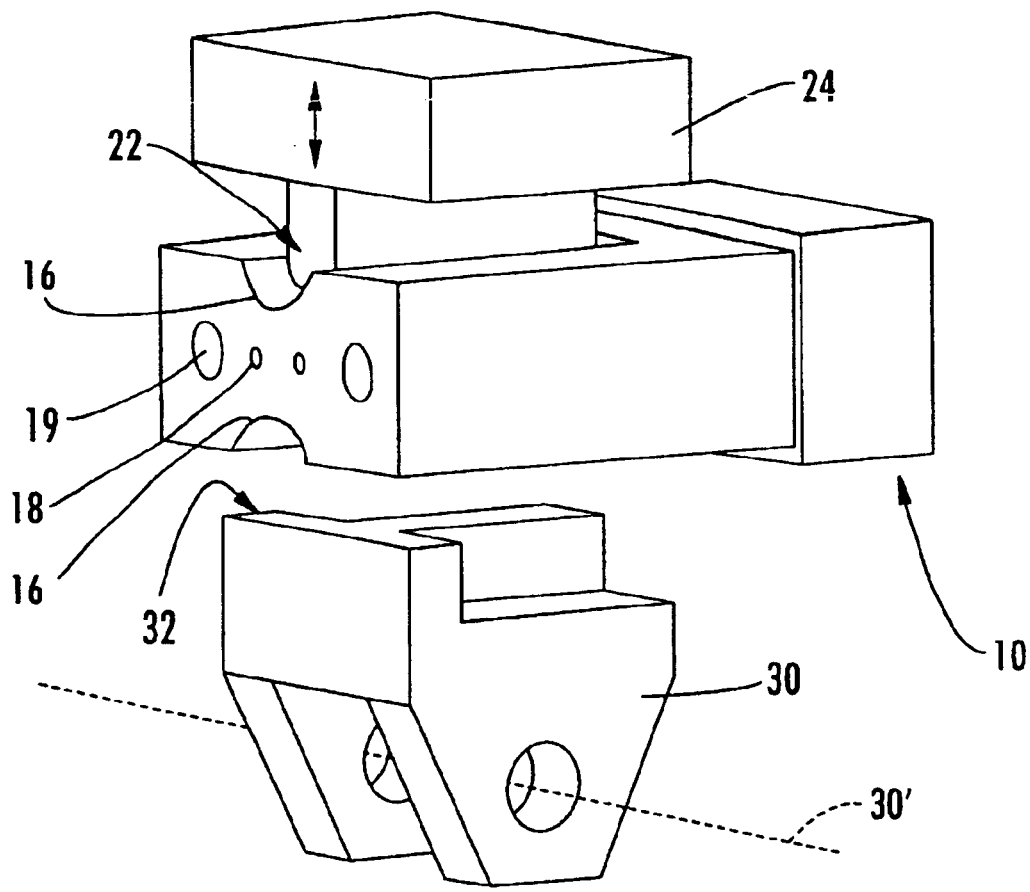
FIG. 4 is a perspective view illustrating the engagement of a ferrule by portions of a jig including a jig body and an opposed pivotable support element according to another embodiment to the present invention in which other portions of the jig and the multifiber connector have also been omitted for purposes of clarity.

The alignment member 22 of the jig body 24 has a cross-sectional shape that is designed to mate with the groove 16 defined by the ferrule 10. Typically, the cross-sectional shape of the alignment member is selected from the group consisting of a semicircular shape and a V-shape. While a V-shaped alignment member can engage a V-shaped groove defined by the ferrule, a semicircularly shaped alignment member can also engage a V-shaped groove defined by the ferrule as best shown in FIGS. 2C, 3, and 4. In this regard, the engagement of a V-shaped groove defined by the ferrule with an alignment member having a semicircular shape in lateral cross-section permits the alignment member to contact the ferrule along two lines. For example, the alignment member of the jig body preferably contacts the ferrule along lines extending lengthwise along both sloping sidewalls of the V-shaped groove. In addition, a semicircular alignment member does not engage the lower portions of the V-shaped groove defined by the ferrule. As such, the size and, in particular, the depth of the V-shaped groove need not be precisely defined and can be rounded off as shown in FIG. 3.

While the alignment member 22 of the illustrated embodiment of the jig body 24 is a lengthwise extending alignment rib having a semicircular shape in lateral cross-section, the outwardly protruding alignment member of the jig body can be formed in other manners, such as by means of a row of balls having precisely defined dimensions. In addition, the jig body can be formed such that the outwardly protruding alignment member is a replaceable component. In this regard, while the outwardly protruding alignment member is not anticipated to wear very rapidly since the sliding contact between the alignment member and the ferrule 10 will be minimized, some wear will occur over time and a jig body having a replaceable alignment member will permit the alignment member to be easily replaced.

The polishing jig 20 also includes a support element 30 having a support surface with a contact element capable of engaging another side of the ferrule 10 opposite the side of the ferrule defining the groove 16 that is engaged by the outwardly protruding alignment member 22 of the jig body 24. As such, the engagement of the ferrule by the support element establishes a third region of contact in order to securely hold the ferrule. According to the present invention, at least one of the support element and the jig body is adapted to pivot or rotate relative to the ferrule so as to uniformly support and evenly load the ferrule during polishing operations. As shown in FIGS. 2C, 3 and 4, for example, the support element of one embodiment is capable of pivoting about an axis 30' perpendicular to the outwardly protruding alignment member. However, the jig body may, instead, be pivotable, if so desired.

The polishing jig 20 of the illustrated embodiment also includes a rotatable hub 26 and an arm 28 extending radially outward from the hub. As shown in FIGS. 2A–2C, the support element 30 is mounted upon a distal end of the arm and is positioned proximate the ferrule 10, albeit on an opposite side of the ferrule from the jig body 24. In addition, the arm can define a window 28a through which the ferrule can protrude during polishing operations.

The arm 28 is typically mounted to the platform 23 and is capable of at least limited movement relative to the platform. For example, the platform of the illustrated embodiment includes a pair of pins 23a extending outwardly therefrom for engaging corresponding radial slots 28b defined by the arm. As such, the arm is capable of radial movement relative to the platform as limited by the size of the radial slots relative to the pins. The polishing jig 20 can also include a bias member, such as a spring, that urges the arm in a radially inward direction in the absence of other forces. Although not shown, the bias member would typically have one end in contact with the arm and the other end in contact with the platform so as to urge the arm in a radial inward direction. While the polishing jig can be designed in many different fashions, the arm of one embodiment includes a tab that extends toward the platform, while the platform also includes a tab that extends toward the arm and is radially spaced therefrom. As such, the bias member can be positioned between the arm and the platform, i.e., proximate the side of the arm hidden from view in FIGS. 2A and 2B, such that the opposite ends of the bias members contact respective tabs and urge the arm radially inward in the absence of other forces.

The polishing jig 20 of the illustrated embodiment also preferably includes means for radially positioning the arm 28 relative to the platform 23. While a variety of techniques can be employed to radially position the arm, the polishing jig of the illustrated embodiment includes the rotatable hub 26 that serves to radially position the arm. In this regard, the hub includes a cam member 26a having a protruding medial portion 26b and recessed lateral portions 26c. As such, rotation of the hub relative to the platform such that the protruding medial portion engages the proximal end of the arm and overcomes the radially inwardly directed bias force so as to cause the arm to be radially extended, thereby moving the support element 30 away from and out of contact with the ferrule 10. Alternatively, rotation of the hub such that a recessed lateral portion engages the proximal end of the arm permits the bias member to draw the arm radially inward and into contact with the ferrule.

Preferably, the support element 30 does not contact the ferrule 10 across all portions of the support surface, since dirt or other contaminants on the ferrule or support surface will reduce the precision of the polishing of the front surface 12 of the ferrule if the dirt is trapped between the ferrule and those portions of the support surface that contact the ferrule. As such, the support element preferably includes a contact element, such as at least one rib 32, protruding outwardly relative to other portions of the support surface. The support element of this embodiment therefore contacts the ferrule with the rib, but not with other portions of the support surface. Thus, any dirt or other contaminants lying on those portions of the ferrule that are not contacted by the rib of the support element will not adversely affect the precision with which the front surface of the ferrule is polished.

The support element 30 can include different numbers of ribs 32 and ribs of various shapes, as shown in FIGS. 3 and 4 in which the ferrule 10 is depicted independent of the connector housing for purposes of clarity. For example, the support element can include a pair of parallel ribs as depicted in FIG. 3. Alternatively, the support element can include a T-shaped rib as shown in FIG. 4. Regardless of the number of ribs or the configuration of the ribs, the support element is preferably designed such that the ribs can contact the ferrule after the ferrule is assembled into a connector. For example, the support element is designed such that the contact element, such as the ribs, can be inserted through the rib slots or other openings defined by the connector housing and into contact with the ferrule. In embodiments in which lengthwise extending grooves 16 are defined in both opposed major surfaces of the ferrule, the ribs are preferably sized and positioned so as not to fall into the grooves. With respect to the embodiment of FIG. 4, for example, the crossbar portion of the T-shaped rib is preferably broader than the groove defined by the ferrule such that the T-shaped rib does not fall within the groove defined by the ferrule. As such, the rib of this embodiment need not necessarily include the stem portion.

While the support element 30 is depicted to include all of the ribs 32, the ferrule 10 could include one or more ribs. In contrast to the support surface that is illustrated and described above, the support surface of this embodiment of the support element could be planar since the only contact between the support element and the ferrule would be along the ribs defined by the ferrule.

In operation, a ferrule 10 according to the present invention is preassembled into a connector, and the connector is then inserted into the polishing jig 20. As shown in FIGS. 2A–2C and described above, the jig of one advantageous embodiment includes a jig body 24 and the pivotable support element 30. At least one of the jig body and the support element can be moved, such as by mechanical means such as a cam-type actuator, in a direction alternately toward and away from the other. In the embodiment illustrated in FIGS. 2A–2C, for example, the support element is adapted to be alternately moved toward and away from the jig body. However, the polishing jig can be designed such that the jig body is movable relative to the support element, if so desired.

With reference to the illustrated embodiment in which the support element 30 is movable relative to the jig body 24, the polishing jig 20 is initially opened by rotating the hub 26 to bring the protruding medial portion 26b into contact with the proximal end of the arm 28, thereby causing the arm to move radially outward which spaces the support element from the jig body. The connector can then be inserted into the polishing jig so as to rest on the pivotable support element. In this regard, the ferrule 10 is preferably positioned upon the support surface of the support element such that the ribs 32 protrude through the rib slots or holes/apertures of the connector housing and contact the ferrule. Once the connector has been properly positioned between the jig body and the support element, the hub is again rotated such that a recessed lateral portion 26c is moved into contact with the proximal end of the arm such that the bias member draws the arm radially inward and the support element is moved into engagement with the ferrule. In this regard, the jig body is moved into position such that the outwardly protruding alignment member 22 of the jig body extends through the rib slot of the connector housing and engages the lengthwise extending groove 12 defined by the ferrule. As such, the ferrule will be securely held in an aligned position between the jig body and the support element such that the front surface 12 of the ferrule can then be polished. Once polishing operations are completed, the support member is again moved out of contact with the ferrule by further rotating the hub and the polished connector can then be removed from the polishing jig. By inserting and removing the connector while the polishing jig is open, the sliding contact between the ferrule and the jig body and the support element is significantly reduced, thereby correspondingly reducing the wear and increasing the lifetime of the jig body and the support element.

The polishing jig 20 of the present invention can be formed in a variety of different manners without departing from the spirit and scope of the present invention. For example, the polishing jig of another embodiment is depicted in FIGS. 5A and 5B. As shown in FIG. 5A, the polishing jig of this embodiment includes a support element 30 that is mounted upon and fixed to the platform 23. While a support element having a T-shaped rib is depicted, the support element can have a variety of other configurations as described-above in conjunction with the embodiment of FIGS. 2A–2C. In addition, the polishing jig includes a jig body 24 pivotably mounted to an arm 28 of the polishing jig. As described above in conjunction with other embodiments, the jig body includes a contact element, such as an alignment feature and, more particularly, such as an alignment rib 22 for engaging a complimentary alignment feature, such as an alignment groove 16, defined by the ferrule 10. Although not shown, the arm can also be mounted so as to pivot or otherwise rotate relative to the platform as described above in conjunction with the embodiment of FIGS. 2A–2C. In this regard, the polishing jig can include a cam or other mechanical means for adjusting the separation between the jig body and the support element as the arm is rotated relative to the platform.

In order to more fully illustrate the manner in which the polishing jig 20 of the present invention is capable of securely engaging in holding a ferrule 10 during polishing operations following preassembly of the connector 44 including assembly of the ferrule into the connecting housing 40, reference is now made to FIG. 5B. As shown, the preassembled connector is inserted through a window 28a defined by the arm 28 such that the forward end of the connector is disposed between the jig body 24 and the support element 30. The arm is then rotated such that the jig body is moved toward the support element. As such, the contact element of the jig body, such as the alignment rib 22, is inserted through an opening 42 defined by the connector housing and engages the corresponding alignment feature, such as the alignment groove 16, defined by the ferrule. Concurrently, the contact element of the support element is inserted through another opening defined by the connector housing so as to engage another side of the ferrule, typically opposite the side engaged by the jig body. In the embodiment depicted in FIGS. 5A and 5B, for example, the stem portion of the T-shaped rib is inserted through the opening defined by the connector housing to engage the ferrule, while the crossbar portion of the T-shaped rib also engages the ferrule, albeit a forward portion of the ferrule that protrudes beyond the connecting housing. As such, the polishing jig and the ferrule of the present invention permit the ferrules of preassembled connectors to be readily polished.

According to the present invention, the ferrule 10 and the polishing jig 20 each include complimentary alignment features that cooperate to permit a ferrule, including a multifiber ferrule, to be preassembled into a fiber optic connector prior to being polished. As a result of the engagement of the ferrule's alignment feature, such as a lengthwise extending groove 16, by the polishing jig's alignment feature, such as an outwardly protruding alignment member 22 carried by a jig body 24, the ferrule is held in a precisely aligned position during the polishing operations without requiring the entire exterior surface of the ferrule to be defined to within very tight tolerances. As such, the ferrule and the polishing jig of the present invention provide an economical and efficient technique for precisely polishing the front surface 12 of the ferrule following the assembly of the ferrule into a fiber optic connector.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A jig for holding a ferrule during polishing operations, the jig comprising:
   a jig body comprising an alignment feature for cooperating with a complimentary alignment feature of the ferrule, wherein said alignment feature of said jig body is selected from the group consisting of an alignment groove and an outwardly protruding alignment member, and wherein said alignment feature of said jig body is selected from the group such that said jig body includes one type of alignment feature and the ferrule includes the other type of alignment feature; and
   a support element having a support surface capable of engaging another portion of the ferrule opposite the portion of the ferrule engaged by said jig body to thereby hold the ferrule in an aligned position during polishing operations,
   wherein at least one of said jig body and said support element is capable of pivoting.

2. The jig according to claim 1 wherein said alignment feature of said jig body is selected from the group consisting of a V-shaped alignment groove and an outwardly protruding alignment member having a semicircular shape in cross-section.

3. The jig according to claim 1 wherein said alignment member of said jig body comprises a lengthwise extending alignment rib.

4. The jig according to claim 3 wherein said support element pivots about an axis perpendicular to said lengthwise extending alignment rib.

5. The jig according to claim 1 wherein said support surface of said support element comprises at least one rib protruding outwardly relative to other portions of said support surface.

6. The jig according to claim 5 wherein said at least one rib comprises a pair of parallel ribs.

7. The jig according to claim 5 wherein said at least one rib comprises a T-shaped rib.

8. A jig for polishing a preassembled connector having a connector housing and a ferrule mounted at least partially therein, the jig comprising:

a jig body having a contact element for engaging one side of the ferrule; and a support element having a support surface with at least one contact element for engaging another side of the ferrule, wherein the contact elements of both said jig body and said support element are sized to be smaller than openings defined by the connector housing such that the contact elements of said jig body and said support element are capable of being inserted through the openings defined by the connector housing and into contact with the ferrule in order to hold the ferrule of the preassembled connector in an aligned position between said jig body and said support element during polishing operations.

9. The jig according to claim 8 wherein the contact element of said jig body comprises an alignment feature for engaging a complimentary alignment feature of the ferrule.

10. The jig according to claim 9 wherein the alignment feature of said jig body is selected from the group consisting of an alignment groove and an outwardly protruding alignment member, and wherein the alignment feature of said jig body is selected from the group such that said jig body includes one type of alignment feature and the ferrule includes the other type of alignment feature.

11. The jig according to claim 10 wherein the alignment feature of said jig body comprises a lengthwise extending alignment rib.

12. The jig according to claim 8 wherein the contact element of said support element comprises at least one rib protruding outwardly relative to other portions of the support surface.

13. The jig according to claim 12 wherein said at least one rib comprises a pair of parallel ribs.

14. The jig according to claim 12 wherein said at least one rib comprises a T-shaped rib.

15. A method for polishing a preassembled connector having a connector housing and a ferrule mounted at least partially therein, the method comprising:

mounting the preassembled connector within a polishing jig having a jig body and a support element;

positioning a contact element of the jig body through an opening defined by the connector housing and into engagement with one portion of the ferrule;

positioning a contact element of the support element through an opening defined by the connector housing and into engagement with another portion of the ferrule; and polishing a front face of the ferrule while the ferrule of the preassembled connector is held in an aligned position between the jig body and the support element.

16. The method according to claim 15 wherein the contact element of the jig body comprises an alignment rib, and wherein said step of positioning the contact element of the jig body through the opening defined by the connector housing comprises inserting the alignment rib into a groove defined by the ferrule for engagement therewith.

17. The method according to claim 16 wherein said step of inserting the alignment rib into a groove defined by the ferrule comprises establishing contact with the ferrule along at least two lines.

18. The method according to claim 15 wherein the support element is capable of pivoting, and wherein said step of positioning the contact element of the jig body through the opening defined by the connector comprises pivotably supporting the ferrule with the support element.

\* \* \* \* \*